US012755531B2

(12) United States Patent
Kim et al.

(10) Patent No.: US 12,755,531 B2
(45) Date of Patent: Oct. 6, 2026

(54) ELECTRONIC DEVICE AND METHOD FOR CONTROLLING THE ELECTRONIC DEVICE THEREOF

(71) Applicant: SAMSUNG ELECTRONICS CO., LTD., Suwon-si (KR)

(72) Inventors: Namuk Kim, Suwon-si (KR); Cheulhee Hahm, Suwon-si (KR); Jayoon Koo, Suwon-si (KR); Wookhyung Kim, Suwon-si (KR); Ilhyun Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 269 days.

(21) Appl. No.: 18/379,969

(22) Filed: Oct. 13, 2023

(65) Prior Publication Data

US 2024/0185603 A1 Jun. 6, 2024

Related U.S. Application Data

(63) Continuation of application No. PCT/KR2023/012709, filed on Aug. 28, 2023.

(30) Foreign Application Priority Data

Dec. 2, 2022 (KR) ........................ 10-2022-0166429

(51) Int. Cl.

*G06V 20/40* (2022.01)
*G06V 10/22* (2022.01)
*G06V 10/82* (2022.01)

(52) U.S. Cl.

CPC ............ *G06V 20/41* (2022.01); *G06V 10/225* (2022.01); *G06V 10/82* (2022.01); *G06V 20/46* (2022.01)

(58) Field of Classification Search

CPC ........ G06V 20/41; G06V 20/46; G06V 10/82; G06V 10/225

See application file for complete search history.

(56) References Cited

U.S. PATENT DOCUMENTS 11,340,345 B2 5/2022 Wu et al.
11,386,662 B2 * 7/2022 Chakraborty .......... G06V 10/75
(Continued)

FOREIGN PATENT DOCUMENTS

KR 10-2285269 B1 8/2021
KR 10-2021-0153421 A 12/2021
(Continued)

OTHER PUBLICATIONS

International Search Report dated Dec. 1, 2023, issued by the International Searching Authority in International Application No. PCT/KR2023/012709 (PCT/ISA/210).
(Continued)

*Primary Examiner* — Utpal D Shah
(74) *Attorney, Agent, or Firm* — Sughrue Mion, PLLC

(57) ABSTRACT

Provided are an electronic device and a control method thereof. The electronic device includes at least one memory storing at least one instruction; and at least one processor connected to the at least one memory and configured to execute the at least one instruction to: input information about a first frame among a plurality of frames to a first object detection network and obtain first information about an object included in the first frame, store the first information in the at least one memory, and input the first information and information about a second frame among the plurality of frames to a second object detection network and obtain second information about an object included in the second frame, wherein the second frame is a next frame following the first frame.

9 Claims, 8 Drawing Sheets

(56) References Cited

U.S. PATENT DOCUMENTS

| | | | | |
|---|---|---|---|---|
| 11,455,763 | B2 | 9/2022 | Wisniowski et al. | |
| 11,790,541 | B2 | 10/2023 | Yoon et al. | |
| 12,322,182 | B1 * | 6/2025 | Kizilgul | G06V 20/64 |
| 2018/0025249 | A1 * | 1/2018 | Liu | G06V 10/255 382/158 |
| 2019/0114804 | A1 * | 4/2019 | Sundaresan | G06T 7/74 |
| 2021/0192756 | A1 * | 6/2021 | Huang | G06N 3/045 |
| 2021/0334985 | A1 * | 10/2021 | Su | G06T 7/73 |
| 2022/0063605 | A1 * | 3/2022 | Ji | G06F 18/2193 |
| 2022/0076059 | A1 * | 3/2022 | Mahbub | G06N 3/084 |
| 2022/0164961 | A1 | 5/2022 | Lee et al. | |
| 2022/0189170 | A1 | 6/2022 | Zhu et al. | |
| 2022/0207259 | A1 * | 6/2022 | Zhang | G06F 18/217 |
| 2022/0270269 | A1 * | 8/2022 | Pattison | G06T 7/248 |
| 2022/0301188 | A1 | 9/2022 | Yoon et al. | |
| 2022/0301219 | A1 * | 9/2022 | Liu | G06V 20/46 |
| 2022/0301275 | A1 * | 9/2022 | Khadloya | G06V 10/62 |
| 2023/0023164 | A1 | 1/2023 | Parameswaran et al. | |
| 2023/0143239 | A1 * | 5/2023 | Yusuf | G06V 20/95 382/175 |
| 2023/0206485 | A1 * | 6/2023 | Rao | G06T 7/73 382/103 |
| 2023/0206613 | A1 * | 6/2023 | Mahbub | G06V 10/454 382/103 |
| 2024/0169709 | A1 * | 5/2024 | Izawa | G06V 10/82 |
| 2024/0354964 | A1 * | 10/2024 | Yanamala | G06V 10/443 |

FOREIGN PATENT DOCUMENTS

| | | | |
|---|---|---|---|
| KR | 10-2021-0155506 | A | 12/2021 |
| KR | 10-2021-0155938 | A | 12/2021 |
| KR | 10-2022-0119824 | A | 8/2022 |
| KR | 10-2022-0129905 | A | 9/2022 |

OTHER PUBLICATIONS

Written Opinion dated Dec. 1, 2023, issued by the International Searching Authority in International Application No. PCT/KR2023/012709 (PCT/ISA/237).

* cited by examiner

ELECTRONIC DEVICE AND METHOD FOR CONTROLLING THE ELECTRONIC DEVICE THEREOF

CROSS-REFERENCE TO RELATED APPLICATIONS

This application is a by-pass continuation of International Application No. PCT/KR2023/012709, filed on Aug. 28, 2023, which is based on and claims priority to Korean Patent Application No. 10-2022-0166429, filed on Dec. 2, 2022, in the Korean Patent Office, the disclosures of all of which are incorporated by reference herein in their entireties.

BACKGROUND

1. Field

The disclosure relates to an electronic device and a controlling method thereof and, more particularly, to an electronic device capable of detecting an object in an image frame by using a neural network and a controlling method thereof.

2. Description of Related Art

Object recognition technology has advanced together with the development of a neural network. Accordingly, there are many cases of utilizing object recognition technology in various industries such as agricultural industry, construction industry, robot industry, forgery and defective product detection.

Object recognition technology goes through 1) detection of an object area and 2) classification of an object area. At this time, a concept of an anchor box is introduced to reduce a process of detection of an object area. The size of an actual object area is detected based on the anchor box, and the object recognition performance may increase as the reference anchor boxes of various sizes are predetermined.

The reason why a reference anchor box of various sizes is required is because the object size is unknown. Therefore, it is common to obtain and use the size of an optimal anchor box by utilizing K-mean clustering in the learning data set. Since the size of an object varies, it is common to use an anchor box having various sizes for training a neural network. However, in the case of using anchor boxes of various sizes, it is necessary to use a Non Maximum Suppression (NMS) process, which is a process of confirming what is the most suitable bounding box based on which anchor box is recognized.

In case of NMS operation, operation by a CPU which is a general-use processor needs to be performed since NMS operation is not performed by a processor specialized in parallel processing like an NPU or a GPU. As the number of anchor boxes increases, the amount of operations significantly increases, so there has been a barrier in utilizing an object recognition technology in an on-device environment. In the case of a moving image, if CPU operation amount is excessive, there may be a problem in real time. Therefore, research into an object recognition technology without an anchor box to reduce NMS operation is active, but criterion is necessary for efficient object recognition.

In particular, an object recognition algorithm has a limitation in that research is concentrated on a still image and temporal information is not efficiently utilized even though a video is generally used rather than a still image.

SUMMARY

According to an aspect of the disclosure, an electronic device includes: at least one memory storing at least one instruction; and at least one processor connected to the at least one memory and configured to execute the at least one instruction to: input information about a first frame among a plurality of frames to a first object detection network and obtain first information about an object included in the first frame, store the first information in the at least one memory, and input the first information and information about a second frame among the plurality of frames to a second object detection network and obtain second information about an object included in the second frame, wherein the second frame is a next frame following the first frame.

The first information may include information about a bounding box including information about a size of the object included in the first frame.

The first object detection network may be trained to obtain information about an object by using a plurality of anchor boxes, and the second object detection network may be trained to obtain information about an object by using a bounding box of an object included in a previous frame as an anchor box.

The at least one processor further may be configured to execute the at least one instruction to: obtain the first information using an anchor box located in a first grid among a plurality of grids, and obtain the second information using a bounding box, as an anchor box, of the object included in the first frame located in the first grid.

The at least one processor may be further configured to execute the at least one instruction to: obtain the first information using an anchor box located in a first grid among a plurality of grids, and obtain the second information using a bounding box, as an anchor box, located in a second grid among the plurality of grids around the first grid based on information about a motion of the object included in the second frame.

The at least one processor may be further configured to execute the at least one instruction to: obtain the first information using an anchor box located in a first grid among a plurality of grids, and obtain the second information using a bounding box, as an anchor box, located in the first grid and a plurality of third grids from among the plurality of grids located at an upper, lower, left, or right portions of the first grid.

Each of the plurality of frames may be classified into a plurality of frame sections, wherein each of the plurality of frame sections may include one intra frame and at least two inter frames, and the first frame may be the intra frame, and the second frame may be an inter frame of the at least two inter frames.

The plurality of frame sections may be classified based on a video frame included in video codec information.

According to an aspect of the disclosure, a method of controlling an electronic device, includes: inputting information about a first frame among a plurality of frames to a first object detection network and obtaining first information about an object included in the first frame: storing the first information in the at least one memory: and inputting the first information and information about a second frame among the plurality of frames to a second object detection network and obtaining second information about an object included in the second frame, wherein the second frame is a next frame following the first frame.

The first information may include information about a bounding box including information about a size of the object included in the first frame.

The first object detection network may be trained to obtain information about an object by using a plurality of anchor boxes, and the second object detection network may be trained to obtain information about an object by using a bounding box of an object included in a previous frame as an anchor box.

The obtaining the first information may include obtaining the first information using an anchor box located in a first grid among a plurality of grids, and the obtaining the second information may include obtaining the second information using the bounding box, as an anchor box, of the object included in the first frame located in the first grid.

The obtaining the first information may include obtaining the first information using an anchor box located in a first grid among a plurality of grids, and the obtaining the second information may include obtaining the second information using a bounding box, as an anchor box, located in a second grid among the plurality of grids around the first grid based on information about a motion of the object included in the second frame.

The obtaining the first information may include obtaining the first information using an anchor box located in a first grid among a plurality of grids, and the obtaining the second information may include obtaining the second information using a bounding box, as an anchor box, located in the first grid and a plurality of third grids from among the plurality of grids located at an upper, lower, left, or right portions of the first grid.

Each of the plurality of frames may be classified into a plurality of frame sections, each of the plurality of frame sections may include one intra frame and at least two inter frames, and the first frame may be the intra frame, and the second frame may be an inter frame of the at least two inter frames.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
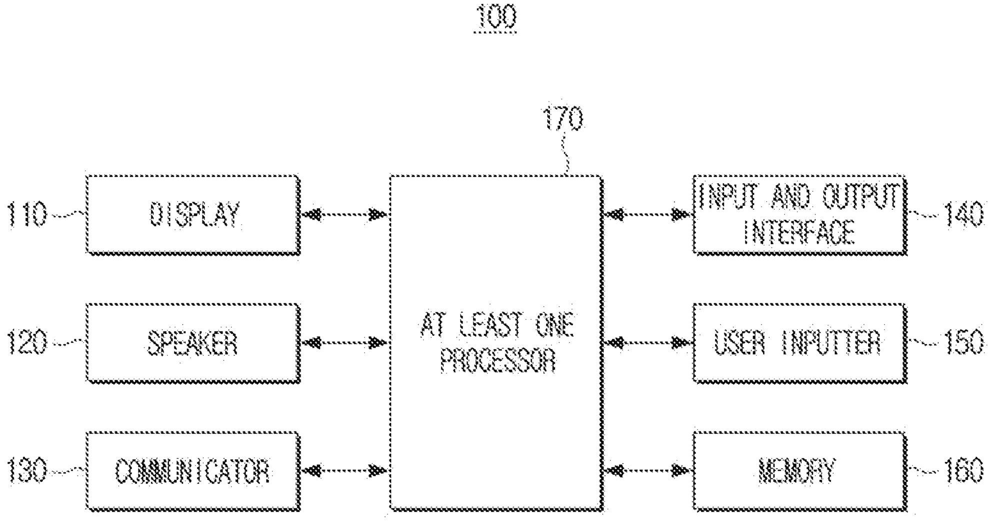
FIG. 1 is a block diagram illustrating a configuration of an electronic device according to one or more embodiments of the disclosure.
Figure 2:
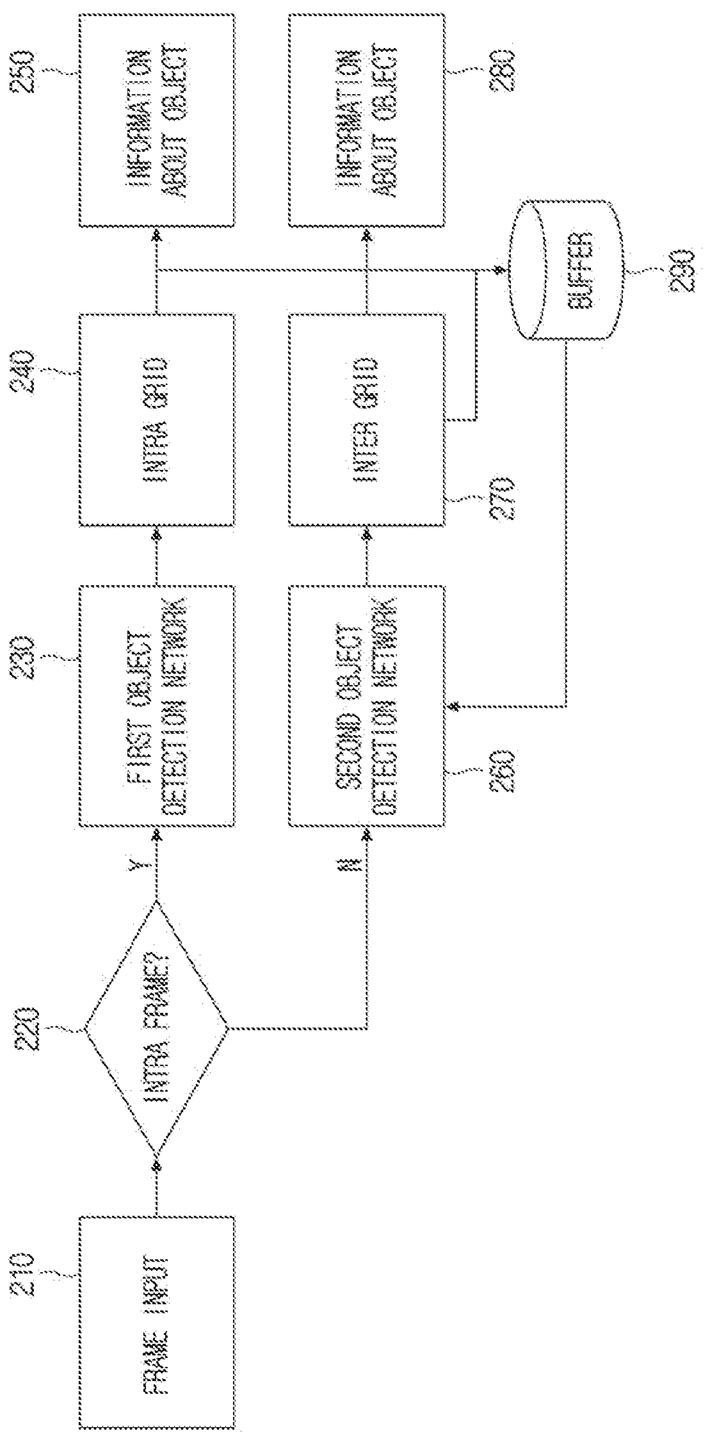
FIG. 2 is a diagram illustrating a method of detecting an object using a plurality of object detection networks according to one or more embodiments of the disclosure.

Hereinafter, embodiments of the disclosure will be described. However, it may be understood that the disclosure is not limited to the embodiments described hereinafter, but also includes various modifications, equivalents, and/or alternatives of the embodiments of the disclosure.

The terms "have", "may have", "include", and "may include" used in the example embodiments of the present disclosure indicate the presence of corresponding features (for example, elements such as numerical values, functions, operations, or parts), and do not preclude the presence of additional features.

In the description, the term "A or B", "at least one of A and/or B", or "one or more of A and/or B" may include all possible combinations of the items that are enumerated together. For example, the term "at least one of A or/and B" includes (1) only A, (2) only B, or (3) both A and B.

In addition, expressions "first", "second", or the like, used in the disclosure may indicate various components regardless of a sequence and/or importance of the components, may be used to distinguish one component from the other components, and do not limit the corresponding components. For example, a first user device and a second user device may indicate different user devices regardless of a sequence or importance thereof. For example, the first component may be named the second component and the second component may also be similarly named the first component, without departing from the scope of the disclosure.

The term such as "module," "unit," "part", and so on may be used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor.

When any component (for example, a first component) is (operatively or communicatively) coupled with/to or is connected to another component (for example, a second component), it is to be understood that any component may be directly coupled with/to another component or may be coupled with/to another component through the other component (for example, a third component). On the other hand, when any component (for example, a first component) is "directly coupled with/to" or "directly connected to" to another component (for example, a second component), it is to be understood that the other component (for example, a third component) is not present between the directly coupled components.

Also, the expression "configured to" used in the disclosure may be interchangeably used with other expressions such as "suitable for," "having the capacity to," "designed to," "adapted to," "made to," and "capable of," depending on cases. Meanwhile, the term "configured to" does not necessarily mean that a device is "specifically designed to" in terms of hardware. Instead, under some circumstances, the expression "a device configured to" may mean that the device "is capable of" performing an operation together with another device or component. For example, the phrase "a processor configured to perform A, B, and C" may mean a dedicated processor (e.g.: an embedded processor) for performing the corresponding operations, or a generic-purpose processor (e.g.: a CPU or an application processor) that can perform the corresponding operations by executing one or more software programs stored in a memory device.

Terms used in the disclosure may be used to describe specific embodiments rather than restricting the scope of other embodiments. Singular forms are intended to include plural forms unless the context clearly indicates otherwise. Terms used in the disclosure including technical and scientific terms may have the same meanings as those that are generally understood by those skilled in the art to which the disclosure pertains. Terms defined in a general dictionary among terms used in the disclosure may be interpreted as having meanings that are the same as or similar to meanings within a context of the related art, and are not interpreted as ideal or excessively formal meanings unless clearly defined in the disclosure. In some cases, terms may not be interpreted to exclude embodiments of the disclosure even where they may be defined in the disclosure.

Embodiments will be further described with reference to the drawings. When detailed description for the known art related to the disclosure may unnecessarily obscure the gist of the disclosure, the detailed description will be omitted. For description of the drawings, the same reference numeral may be used for the similar element.

Hereinbelow, the disclosure will be described in detail with reference to drawings.

FIG. 1 is a block diagram illustrating a configuration of the electronic device 100 according to one or more embodiments of the disclosure. FIG. 1 is a block diagram illustrating a configuration of an electronic device 100 according to an embodiment of the disclosure. As shown in FIG. 1, the electronic device 100 may include a display 110, a speaker 120, a communicator 130, an input and output interface 140, a user inputter 150, a memory 160, and at least one processor 170. Meanwhile, the electronic device 100 illustrated in FIG. 1 may be a display device such as a smart TV, but this is merely an embodiment, and the electronic device 100 may be a user terminal such as a smartphone, a tablet PC, a notebook PC, or the like, and may be implemented as a server or the like. In addition, the configuration of the electronic device 100 illustrated in FIG. 1 is merely an embodiment, and some components may be added or deleted according to the type of the electronic device 100.

The display 110 may output various information. In particular, the display 110 may output content provided from various sources. For example, the display 110 may output broadcast content received from the outside, output game content received through a game server, and output broadcast content or game content received from an external device (for example, a set-top box or a game machine) connected through the input and output interface 140.

In addition, the display 110 may output an image frame including at least one object, and at this time, the bounding box may be output together on at least one object sensed in the image frame.

The display 110 may be implemented as a liquid crystal display panel (LCD), organic light emitting diode (OLED) display, or the like, and the display 110 may be implemented as a flexible display, a transparent display, or the like, according to use cases. The display 110 according to the disclosure is not limited to a specific type.

The speaker 120 may output various voice messages and audio. In particular, the speaker 120 may output audio of various contents. Here, the speaker 120 may be provided inside the electronic device 100, but this is merely an embodiment, and the speaker 120 may be provided outside the electronic device 100 and electrically connected to the electronic device 100.

The communicator 130 may include at least one circuitry and may communicate with various types of external devices or servers. The communicator 130 may include at least one of a Bluetooth Low Energy (BLE) module, a Wi-Fi communication module, a cellular communication module, a third generation (3G) mobile communication module, a fourth generation (4G) mobile communication module, a fourth generation Long Term Evolution (LTE) communication module, and a fifth generation (5G) mobile communication module.

In particular, the communicator 130 may receive image content including a plurality of image frames from an external server. Here, the communicator 130 may receive a plurality of image frames from an external server in real time and output the image frames through the display 110, but this is merely an embodiment, and the communicator 130 may receive all of the plurality of image frames from an external server and then output the image frames through the display 110.

The input and output interface 140 may be one of the interfaces, such as, for example, and without limitation, at least one of a high-definition multimedia interface (HDMI), mobile high-definition link (MHL), universal serial bus (USB), display port (DP), Thunderbolt, video graphics array (VGA) port, RGB port, d-subminiature (D-SUB), digital visual interface (DVI), and the like. According to an embodiment, the input and output interface 140 may include a port for inputting or outputting an audio signal or a video signal separately, or may be implemented as one port that inputs or outputs all the audio signals or video signals.

In particular, the electronic device 100 may receive an image content including a plurality of image frames from an external device through the input and output interface 140.

The user inputter 150 may include a circuitry and the at least one processor 170 may receive a user command to control the operation of the electronic device 100 through the user inputter 150. To be specific, the user inputter 150 may be implemented with a remote control, but this is merely exemplary, and the user inputter 150 may be composed of a touch screen, a button, a keyboard, a mouse, or the like.

In addition, the user inputter 150 may include a microphone capable of receiving a user voice. Here, when the user inputter 150 is implemented with a microphone, a microphone may be provided inside the electronic device 100. However, this is merely an embodiment, and a user voice may be received through a remote controller for controlling the electronic device 100 or a portable terminal (for example, a smartphone, an AI speaker, etc.) in which a remote control application for controlling the electronic device 100 is installed. At this time, the remote controller or the portable terminal may transmit information about the user voice to the electronic device 100 through Wi-Fi, Bluetooth, and an infrared communication method. The electronic device 100 may include a plurality of communicators for communication with a remote controller or a portable terminal. In addition, in the electronic device 100, a communicator communicating with a server and a communicator communicating with a remote controller (or a portable terminal) may be different from each other (for example, communicating with a server by an inner jet model, and a Wi-Fi and communicating with a remote control or a portable terminal by Bluetooth), but this is merely exemplary, and the communicators may be in the same type (e.g., Wi-Fi).

In particular, the user inputter 150 may receive a user command, or the like, to detect an object from an image frame.

The memory 160 may store operating system (OS) for controlling overall operations of the elements and instruction or data related to the elements of the electronic device 100. In particular, the memory 160 may store various configurations to detect an object from an image frame.

In addition, the memory 160 may store information about a neural network model like the first and second object detection networks.

In addition, the memory 160 may include a buffer for temporarily storing information about an object output from the first and second object detection networks (particularly, information about a bounding box indicating the size of the object).

The memory 160 may be implemented with a non-volatile memory (e.g., hard disk, solid state drive (SSD), flash memory), a volatile memory (a memory inside at least one processor 170 may be included).

The at least one processor 170 may control the electronic device 100 according to at least one instruction stored in the memory 160.

In particular, the at least one processor 170 may include at least one processor. To be specific, one or more processors may include one or more of a Central Processing Unit (CPU), a Graphics Processing Unit (GPU), an Accelerated Processing Unit (APU), a Many Integrated Core (MIC), a Digital Signal Processor (DSP), a Neural Processing Unit (NPU), a hardware accelerator, or a machine learning accelerator. The one or more processors may control one or any combination of other components of the electronic apparatus and may perform operations or data processing relating to the communication. The one or more processors may execute one or more programs or instructions stored in the memory. For example, one or more processors may perform a method in accordance with one or more embodiments of the disclosure by executing one or more instructions stored in a memory.

When a method according to one or more embodiments of the disclosure includes a plurality of operations, a plurality of operations may be performed by one processor or may be performed by a plurality of processors. For example, when a first operation, a second operation, and a third operation are performed by a method according to one or more embodiments, all of the first operation, the second operation, and the third operation may be performed by the first processor, the first operation and the second operation may be performed by a first processor (e.g., a general purpose processor), and the third operation may be performed by a second processor (e.g., an artificial intelligence dedicated processor). For example, according to one or more embodiments of the disclosure, an operation of detecting an object using first and second object detection networks may be performed by a processor performing parallel operation like GPU or NPU, and an operation of non-maximum suppression (NMS) for identifying a bounding box among a plurality of anchor boxes may be performed by a general-use processor like CPU.

The one or more processors may be implemented as a single core processor including one core, or may be implemented as one or more multicore processors including a plurality of cores (for example, homogeneous multi-cores or heterogeneous multi-cores). When the one or more processors are implemented as a multi-core processor, each of the plurality of cores included in the multi-core processor may include a processor internal memory such as a cache memory and an on-chip memory, and a common cache shared by the plurality of cores may be included in the multi-core processor. In addition, each of a plurality of cores (or a part of a plurality of cores) included in the multi-core processor may independently read and perform a program command for implementing a method according to one or more embodiments of the disclosure, and may read and perform a program command for implementing a method according to one or more embodiments of the disclosure in connection with all (or a part of) a plurality of cores.

When the method according to one or more embodiments of the disclosure includes a plurality of operations, the plurality of operations may be performed by one core among a plurality of cores included in the multi-core processor or may be performed by the plurality of cores. For example, when a first operation, a second operation, and a third operation are performed by a method according to one or more embodiments, all the first operation, second operation, and third operation may be performed by a first core included in the multi-core processor, and the first operation and the second operation may be performed by a first core included in the multi-core processor and the third operation may be performed by a second core included in the multi-core processor.

In the embodiments of the disclosure, the processor may mean a system-on-chip (SoC), a single core processor, a multi-core processor, or a core included in a single core processor or a multi-core processor in which one or more processors and other electronic components are integrated, wherein the core may be implemented as a CPU, a GPU, an APU, a MIC, a DSP, an NPU, a hardware accelerator, or a machine learning accelerator, but embodiments of the disclosure are not limited thereto.

In particular, at least one processor 170 may obtain information about an object included in the first frame by inputting information about a first frame among a plurality of frames to a first object detection network. At least one processor 170 may store information about an object obtained for the first frame in a buffer. The at least one processor 170 obtains information about an object included in the second frame by inputting information about a second frame which is a next frame following the first frame and information about an object included in the first frame to the second object sensing network.

The information about an object included in the first frame may include information about a bounding box including information about a size of an object included in the first frame. The at least one processor 170 may obtain information about an object included in the second frame by inputting information about a second frame and information about a bounding box to the second object detection network.

The first object detection network is network trained to obtain information about an object by using a plurality of anchor boxes, and the second object detection network may be a network trained to obtain information about an object by using a bounding box of an object included in a previous frame as an anchor box.

As an embodiment, at least one processor 170 may obtain information about an object included in a first frame by using an anchor box located in a first grid among a plurality of grids. The at least one processor 170 may obtain information about an object included in the second frame by using a bounding box of an object included in the first frame located in the first grid as an anchor box.

According to an embodiment, at least one processor 170 may obtain information about an object included in a first frame by using an anchor box located in a first grid among a plurality of grids. The at least one processor 170 may obtain information about an object included in a second frame by using, as an anchor box, a bounding box located in a second grid around the first grid from among the plurality of grids based on the information about the motion of the object.

According to an embodiment, at least one processor 170 may obtain information about an object included in a first frame by using an anchor box located in a first grid among a plurality of grids. The at least one processor 170 may obtain information about an object included in a second frame by using, as an anchor box, a bounding box located in a first grid from among the plurality of grids and a plurality of third grids located at the top, bottom, left, and right sides of the first grid.

In the meantime, the plurality of frames may be divided into a plurality of frame sections. Each of the plurality of frame sections may include one intra frame and two or more inter frames. The first frame may be the intra frame and the second frame may be an inter frame. In addition, the plurality of frame sections may be distinguished by information about a video frame included in the video codec information.

Hereinbelow, the disclosure will be described in detail with reference to FIGS. 2 to 7.

The electronic device 100 may receive a first frame 210. The electronic device 100 may receive a plurality of frames included in image content in real time. The plurality of frames included in the image content may be divided into a plurality of frame sections. Each of the plurality of frame sections may include one intra frame and two or more inter frames. Here, the intra frame may be referred to as an I-frame, and may be a key frame among a plurality of frames included in a frame section. The intra frame may be independently compressed irrespective of other frames. The inter frame may also include a B-frame or a P-frame. The B-frame is an abbreviation of a Bi-directional frame for interpolating between frames located before and after the frame. That is, if it is referred to as a B-frame between the I-frame and the P-frame, the B-frame is compressed using the I-frame and the P-frame. The P-frame is an abbreviation of a Predicted frame, and may be a sub-key frame. Here, the P-frame may be compressed using a difference from another frame just ahead.

Figure 3:
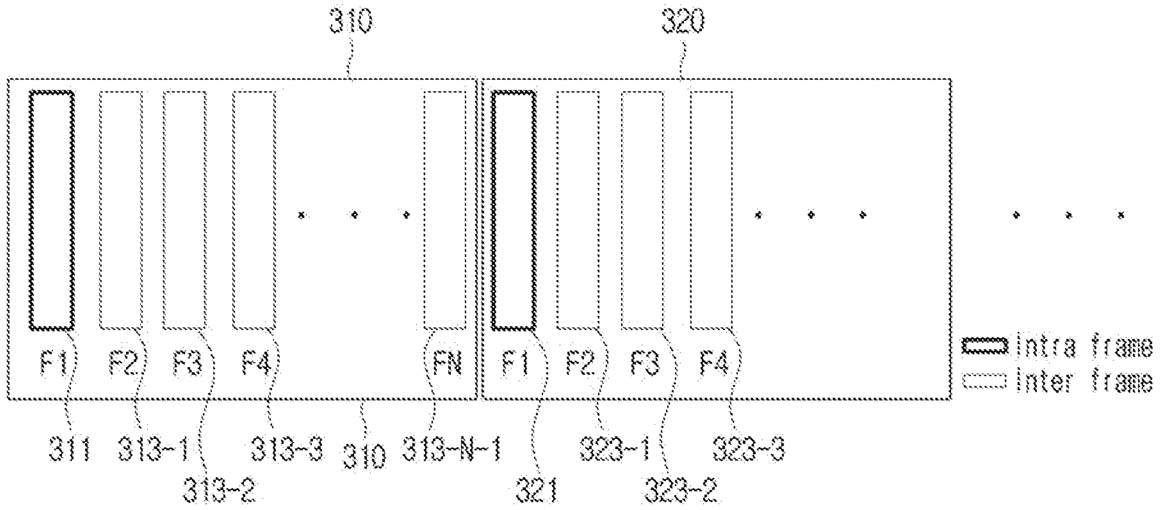
FIG. 3 is a diagram illustrating an infra frame and an inter frame according to one or more embodiments of the disclosure.

According to an embodiment of the disclosure, as shown in FIG. 3, a plurality of frames included in image content may include a plurality of frame sections including a first frame section 310 and a second frame section 320. Here, the first frame section 310 may include a first intra frame 311 and a plurality of first inter frames 313-1, 313-2, 313-3, . . . , 313-N−1, and the second frame section 320 may include a second intra frame 321 and a plurality of second inter frames 323-1, 323-2, 323-3, . . . .

At this time, the plurality of frame sections may be divided based on a predetermined number. For example, a plurality of frame sections may be divided into ten units. That is, each of the plurality of frame sections may include one intra frame and nine inter frames. Alternatively, the plurality of frame sections may be divided by information about a video frame included in the video codec information (for example, GOP information of a video codec or information about an intra frame and an inter frame of a video codec, motion vector information, and the like).

The electronic device 100 may identify whether the first frame is an intra frame (220). That is, the electronic device 100 may identify whether the first frame is an intra frame or an inter frame.

Based on it being identified that the first frame is an intra frame in operation 220-Y, the electronic device 100 may input a first frame (i.e., an intra frame) to the first object detection network 230. Here, the first object detection network 230 may be a network trained to obtain information about an object in an image frame by using a plurality of anchor boxes.

Figure 4:
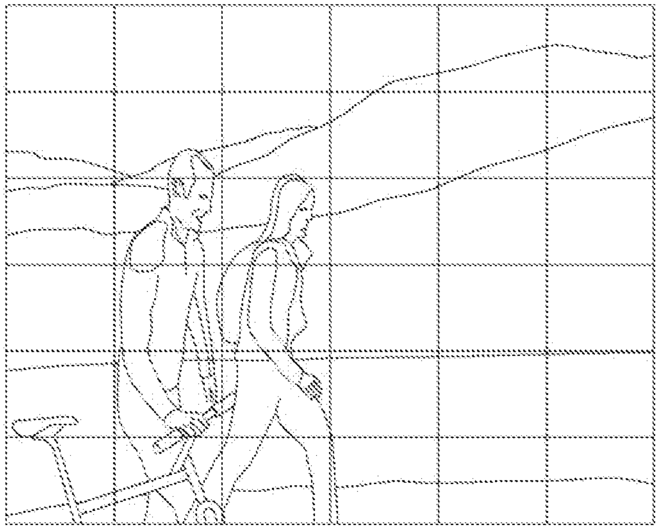
FIG. 4 is a diagram illustrating a grid of a frame according to one or more embodiments of the disclosure.

Here, the electronic device 100 may obtain information about the intra grid 240 by the first object detection network 230. In this case, the grid refers to a unit block obtained by dividing an image frame into a plurality of blocks in order to recognize an object in an image frame, and for example, as illustrated in FIG. 4, the image frame may be divided into a 6×6 grid. The electronic device 100 may identify an area in which an object is located in units of grids. Meanwhile, as shown in FIG. 4, the grid may have a rectangular shape, but this is merely an embodiment, and may have various shapes such as a lateral type, a circular shape, and the like.

Figure 5:
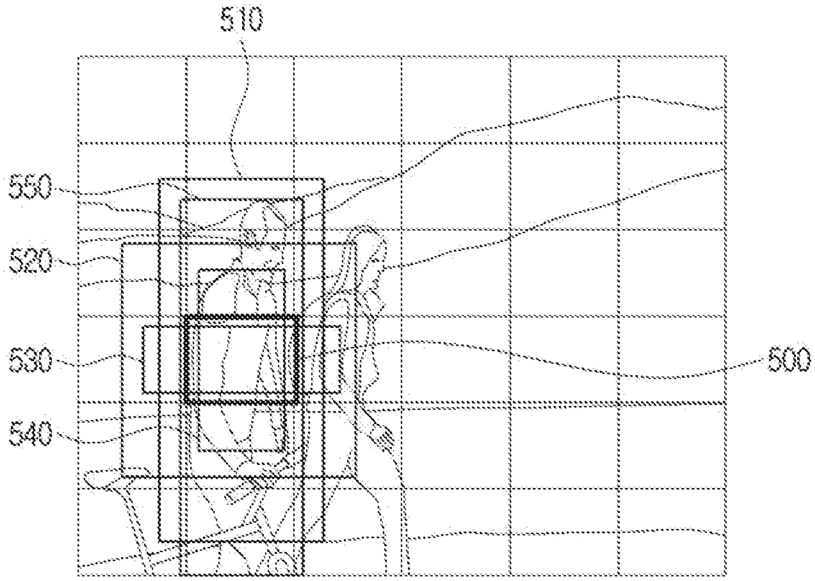
FIG. 5 is a diagram illustrating a plurality of anchor boxes included in one grid according to one or more embodiments of the disclosure.
Figure 6:
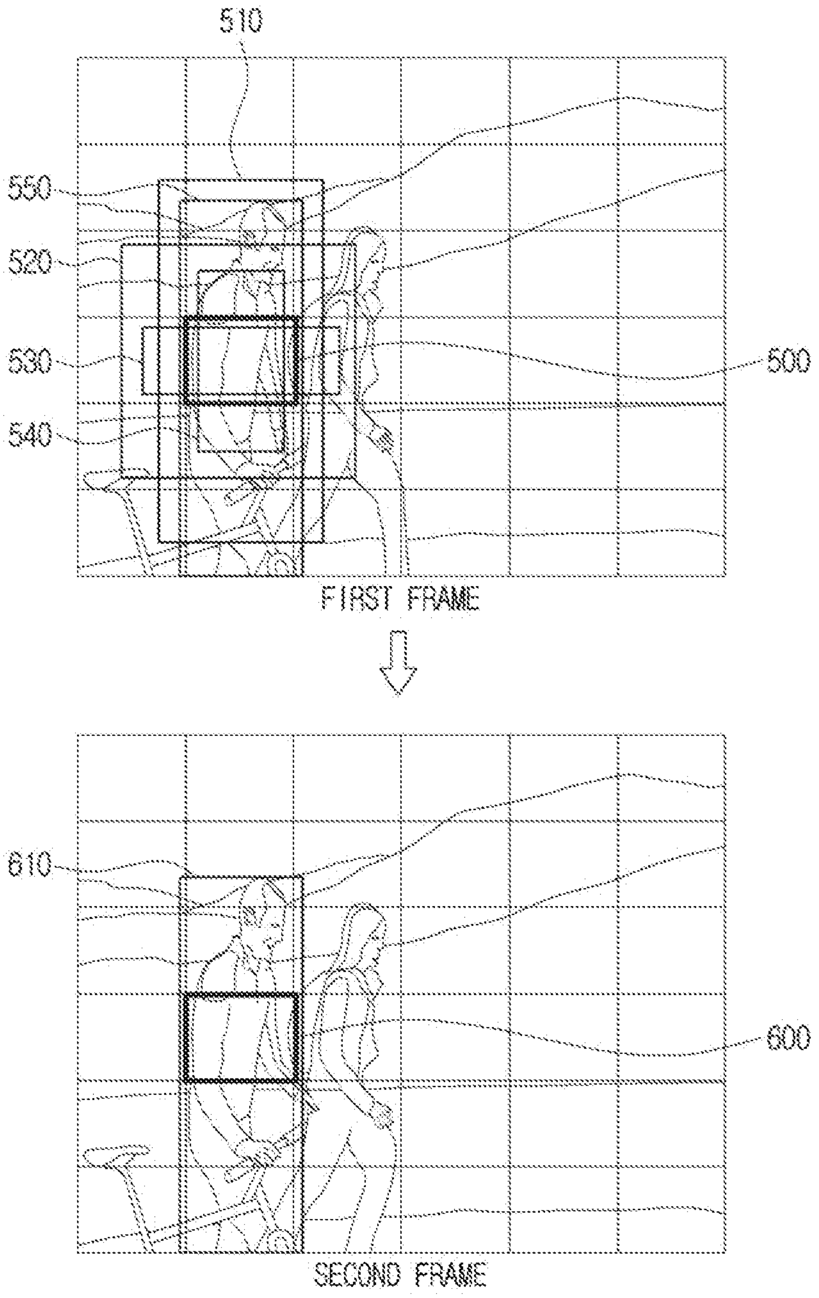
FIG. 6 is a diagram illustrating a method of detecting an object in a plurality of objects using the same grid according to one or more embodiments of the disclosure.
Figure 7:
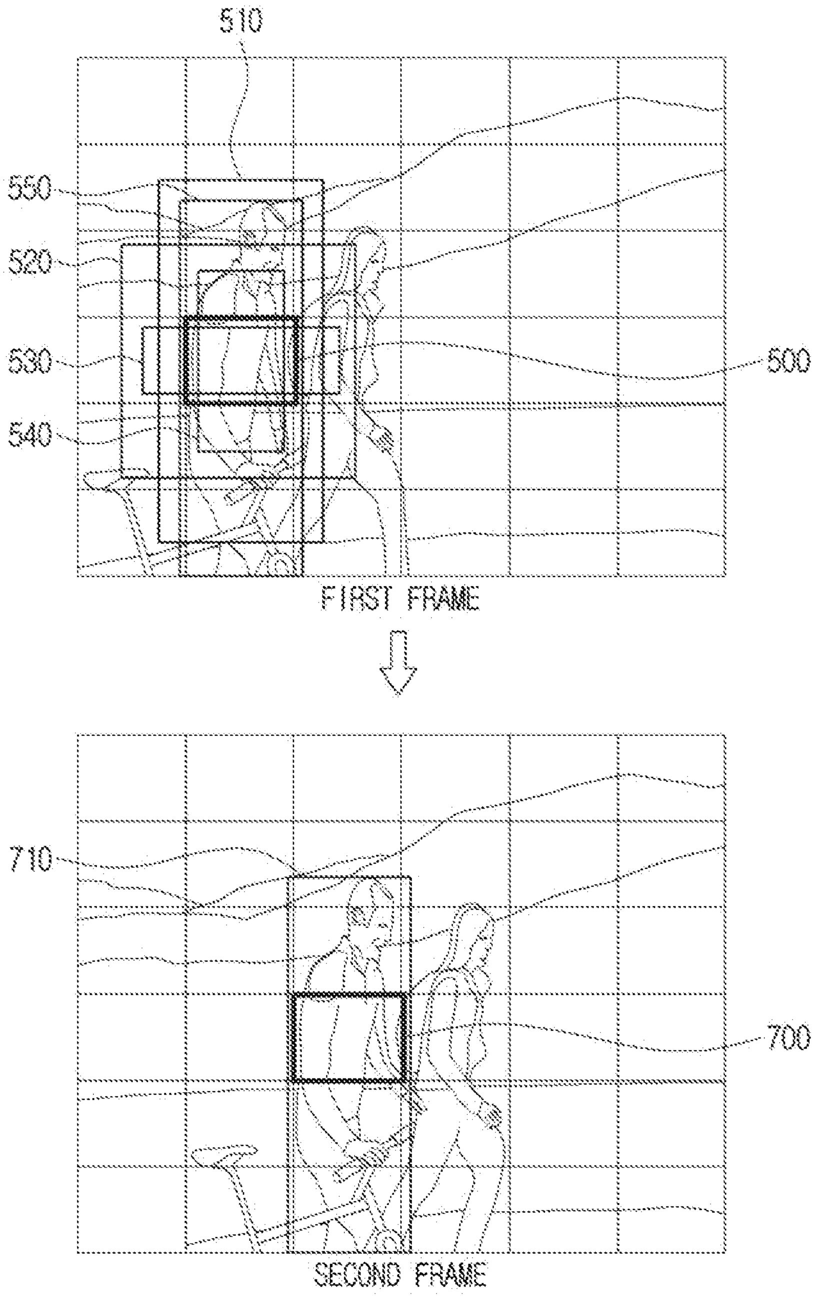
FIG. 7 is a diagram illustrating a method of detecting an object in a plurality of frames using information about a motion of an object according to one or more embodiments of the disclosure.

In particular, the information about the intra grid 240 may include information about a probability that an object is to be included in a plurality of anchor boxes included in each of the plurality of grids of the intra frame. For example, as shown in FIG. 5, based on five anchor boxes 510 to 550 being included in one first grid 500, information about the intra grid 240 may include information about a probability that an object will be included in a first anchor box 510 included in a first grid 500, information about a probability that an object will be included in a third anchor box 530 included in the first grid 500, information about a probability that an object is included in a fourth anchor box 540 included in the first grid 500, and information about a probability that an object is included in a fifth anchor box 550 included in the first grid 500. In such way, the information about the intra grid 240 may include information about a probability that an object is to be included in five anchor boxes included in each of the plurality of grids.

As another embodiment, the first grid 500 may be implemented with one anchor box. That is, the information included in the intra grid 240 may include an anchor box corresponding to the first grid 500 and information about probability that an object is included inside the five anchor boxes 510-550.

The electronic device 100 may obtain information 250 about the object based on the information about the intra grid 240. That is, the electronic device 100 may obtain information 250 for an object in an intra frame based on the information about a probability that an object is to be included in a plurality of anchor boxes included in each of the plurality of grids of the intra frame. Here, the information 250 about the object may obtain information about a bounding box including information about the size of an object in the intra frame as well as an area in which an object in the intra frame is located. That is, the information about the bounding box may include information about the width and height of the object, which is information about the size of the object.

For example, as shown in FIG. 5, based on the first grid 500 being detected as a grid in which an object is located and a fifth anchor box 550 being detected as a bounding box in which an object is detected, the electronic device 100 may store information about the first grid 500 as an area where the object is located and information about the width and height of the fifth anchor box 550 as information about the bounding box including the size of the object.

The electronic device 100 may store information 250 about the object in a buffer 290. In particular, the electronic device 100 may store information about a bounding box corresponding to an object including information about the size of an object in an intra frame among information 250 about the object.

The electronic device 100 may display a bounding box corresponding to the object detected on an image frame displayed on the display 110.

The electronic device 100 may receive a second frame (or frame of a time point of t) which is the subsequent frame of the first frame (or frame of a time point of t−1) (210).

The electronic device 100 may identify whether the second frame is an infra frame (220). That is, the electronic device 100 may identify whether the second frame is an intra frame or an inter frame.

If it is identified that the second frame is an inter frame in operation 220-N, the electronic device 100 may input information about an object of a second frame (i.e., an inter frame) and a previous frame (in particular, information about a bounding box of a previous frame) to the second object detection network 260. Here, the second object detection network 260 may be a network trained to obtain information about an object by using a bounding box of an object included in a previous frame as an anchor box.

At this time, the electronic device 100 may obtain information about inter grid 270 by the second object detection network 260. Here, the information about the inter grid 270 may include information about a probability that an object will be included in an anchor box included in each of at least one grid among the plurality of grids of the inter frame. At this time, the electronic device 100 may use a bounding box of an object included in a previous frame stored in a buffer 290 as an anchor box of each of at least one grid among a plurality of grids of the inter frame.

For example, based on a bounding box of an object being detected as a fifth anchor box 550 in a previous frame (i.e., a first frame), the electronic device 100 may obtain information about a probability that an object will be included in each of at least one grid among a plurality of grids of an inter frame by using a fifth anchor box 550, which is a bounding box, as an anchor box of an inter frame (i.e., a second frame).

According to an embodiment, the electronic device 100 may detect an object in a current frame by using a bounding box of the same grid as a grid in which an object is detected in a previous frame. That is, based on information about an object included in the first frame being obtained by using an anchor box located in a first grid among the plurality of grids, the electronic device 100 may obtain information about an object included in the second frame by using the bounding box of the object included in the first frame located in the first grid as an anchor box. For example, as shown in the upper end of FIG. 6, based on an object being detected in the fifth anchor box 550 of the first grid 500 of a first frame, the electronic device 100 may detect an object of a second frame by using a bounding box 610 of a first grid 600 of a second frame, which is the same grid as the first grid 500 of the first frame, as an anchor box, as shown in the lower end of FIG. 6.

As an embodiment, the electronic device 100 may obtain information about an object included in the second frame by using a bounding box, as an anchor box, located in a second grid around the first grid in which an object is detected in the previous frame among a plurality of grids, based on information about a motion of the object. Here, the information on the motion of the object may be at least one of a motion vector or an optical flow. For example, as shown in the upper part of FIG. 7, based on an object being detected in the fifth anchor box 550 of the first grid 500 of the first frame and motion information of an object moving to the right is obtained, the electronic device 100 may detect an object of the second frame by using a bounding box 710 of a second grid 700 as an anchor box, as shown in the lower part of FIG. 7.

According to an embodiment, the electronic device 100 may obtain information about an object included in the second frame by using, as an anchor box, a bounding box located in a first grid in which an object is detected in a previous frame among the plurality of grids and a plurality of third grids located at the upper, lower, left, and right sides of the first grid.

That is, the electronic device 100 may obtain information about an object included in the second frame by using the bounding box of the third grid located on the upper, lower, left, and right sides of the first grid as well as the second grid identified according to the grid in which the object is detected or motion information of the object.

As another embodiment, the electronic device 100 may obtain information about an object included in the second frame by using a bounding box of a plurality of grids as an anchor box.

The electronic device 100 may obtain information 280 about the object based on the information about the inter grid 270. That is, the electronic device 100 may obtain information 280 about an object in the inter frame based on information about a probability that an object is to be included in an anchor box (i.e., a bounding box of a previous frame) included in each of at least one frame of the inter frame. Here, the information 280 about the object may obtain information on a bounding box including information on the size of an object in the inter frame as well as an area in which an object in the inter frame is located.

The electronic device 100 may store the information 250 about an object included in the inter frame in the buffer 290. In particular, the electronic device 100 may store information about a bounding box corresponding to an object including information about a size of an object in the inter frame, among the information 250 about the object.

The electronic device 100 may keep displaying a bounding box corresponding to the object detected on an image frame displayed on the display 110.

In the same manner as described above, based on an inter frame being inputted before an intra frame is inputted, the electronic device 100 may obtain information on the object included in the inter frame by inputting information about a bounding box of an inter frame and a previous frame to the second object detection network. That is, the electronic device 100 may obtain information about the object of the current frame by using the bounding box of the previous frame as an anchor box.

Based on a new intra frame being inputted, the electronic device 100 may obtain information about an object included in the intra frame by inputting information about a new intra frame to the first object detection network.

Based on information about an object of an inter frame being obtained in the same manner as described above, the number of anchor boxes for obtaining information on the object may be significantly reduced, so an NMS process which requires CPU operation may be reduced. Accordingly, a computation amount reduction effect may be improved in an on-device environment by reducing an NMS process in which an excessive operation is required. In addition, since the NMS process is reduced, the network size may be reduced or the object may be detected more quickly in a video that is input in real time.

Figure 8:
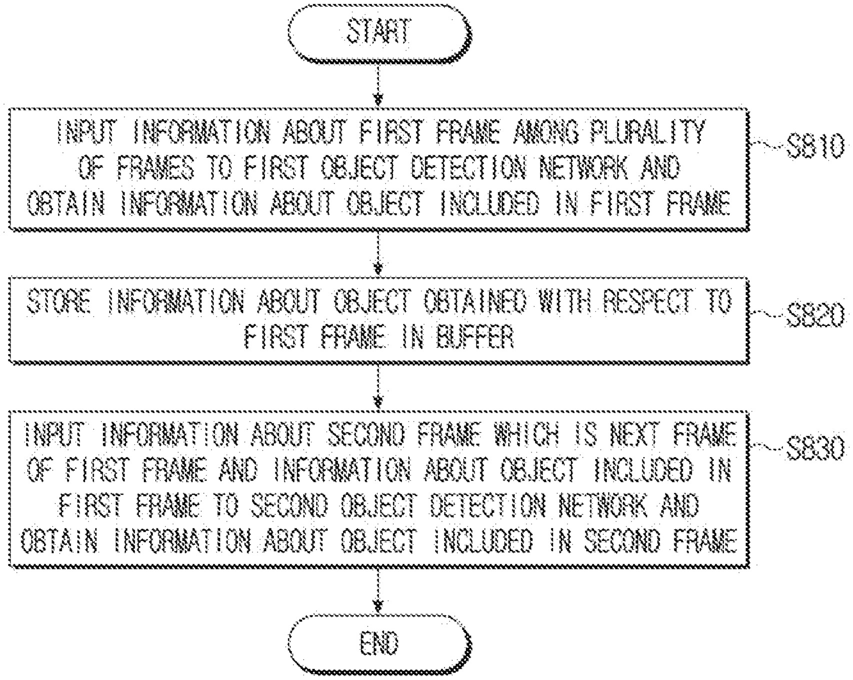
FIG. 8 is a flowchart illustrating a method of controlling an electronic device to detect an object according to one or more embodiments of the disclosure.

FIG. 8 is a flowchart illustrating a method of controlling an electronic device to detect an object according to one or more embodiments of the disclosure.

The electronic device may 100 obtain information about an object included in the first frame by inputting information about a first frame among a plurality of frames to a first object detection network in operation S810. In this case, the information about the object included in the first frame may include information about a bounding box including information about the size of the object included in the first frame. In addition, the first object detection network may be a network trained to obtain information about an object by using a plurality of anchor boxes.

The electronic device 100 may store information about an object obtained with respect to the first frame in a buffer in operation S820.

The electronic device 100 may input information about a second frame which is a next frame following the first frame and information about an object included in the first frame to a second object detection network and obtain information about an object included in the second frame in operation S830. The second object detection network may be a network trained to obtain information about an object by using a bounding box of the object included in the previous frame as an anchor box.

In particular, the electronic device 100 may obtain information about the object included in the second frame by inputting the information about the second frame and information about the bounding box to the second object detection network.

In addition, the electronic device 100 may obtain information about an object included in a second frame by using, as an anchor box, a bounding box located in a first grid in which an object is sensed in a first frame.

Also, the electronic device 100 may obtain information about an object included in a second frame by using, as an anchor box, a bounding box located in a second grid around a first grid in which an object is detected from a first frame among the plurality of grids based on the information on the motion of the object.

In addition, the electronic device 100 may obtain information about an object included in the second frame by using a bounding box, as an anchor box, located in the first grid in which an object is detected in the first frame among a plurality of grids and a plurality of third grids located at an upper, lower, left, or right portions of the first grid.

According to one or more embodiments, a plurality of frames may be classified into a plurality of frame sections. Each of the plurality of frame sections may include one intra frame and two or more inter frames, and the first frame may be the intra frame, and the second frame may be an inter frame. In the meantime, a plurality of frame sections may be divided by a predetermined number, but this is merely an embodiment, and may be distinguished by information on a video frame included in video codec information.

One processor 170 or a plurality of processors 170 according to one or more embodiments may control the processing of input data according to a predefined operating rule stored in the memory 160 or AI model. The predefined operating rule or learning network model may be made by learning.

Here, being made through learning may mean that, by applying learning algorithm to a plurality of learning data, a learning network model of a desired characteristic is made. Such learning may be accomplished in the machine itself in which the learning network model is performed, and may be implemented via a separate server/system.

An artificial intelligence model (e.g., first and second object detection networks) may be implemented as a plurality of neural network layers. At least one layer may have at least one weight values and performs operation of layers through at least one defined operation and the operation result with a previous layer. The example of the neural network may include a convolutional neural network (CNN), a deep neural network (DNN), a recurrent neural network (RNN), a restricted national Boltzmann machine (RBM), a deep belief network (DBN), a bidirectional recurrent deep neural network (BRDNN), a deep Q-networks, or a transformer, and the neural network in this disclosure is not limited to the above example unless otherwise specified.

The learning algorithm is a method for training a predetermined target device using a plurality of learning data to cause the predetermined target device to make a determination or prediction by itself. Examples of learning algorithms include supervised learning, unsupervised learning, semi-supervised learning, or reinforcement learning, and the learning algorithm in the disclosure is not limited to the examples described above except when specified.

According to embodiments, a method disclosed herein may be provided in software of a computer program product. A computer program product may be traded between a seller and a purchaser as a commodity. A computer program product may be distributed in the form of a machine readable storage medium (e.g., compact disc read only memory (CD-ROM)) or distributed online through an application store (e.g., PlayStore™) or distributed (e.g., download or upload) online between two user devices (e.g., smartphones) directly. In the case of on-line distribution, at least a portion of the computer program product (e.g., a downloadable app) may be stored temporarily or at least temporarily in a storage medium such as a manufacturer's server, a server in an application store, or a memory in a relay server.

Meanwhile, one or more embodiments of the disclosure may be implemented in software, including instructions stored on machine-readable storage media readable by a machine (e.g., a computer). An apparatus may call instructions from the storage medium, and execute the called instruction, including an electronic apparatus according to the disclosed embodiments.

A machine-readable storage medium may be provided in the form of a non-transitory storage medium. Herein, the term "non-transitory" only denotes that a storage medium does not include a signal but is tangible, and does not distinguish the case in which a data is semi-permanently stored in a storage medium from the case in which a data is temporarily stored in a storage medium. For example, "non-transitory storage medium" may include a buffer in which data is temporarily stored.

When the instructions are executed by a processor, the processor may perform a function corresponding to the instructions directly or by using other components under the control of the processor. The instructions may include a code generated by a compiler or a code executable by an interpreter.

While preferred embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An electronic device comprising:

at least one memory storing at least one instruction; and at least one processor connected to the at least one memory and configured to execute the at least one instruction to:

input information about a first frame among a plurality of frames to a first object detection network and obtain first information about an object included in the first frame, store the first information in the at least one memory, and input the first information and information about a second frame among the plurality of frames to a second object detection network and obtain second information about an object included in the second frame, wherein the second frame is a next frame following the first frame, wherein the first object detection network and the second object detection network are separate object detection networks, wherein the first object detection network is trained to obtain information about an object by using a plurality of anchor boxes, and wherein the at least one processor is further configured to execute the at least one instruction to:

obtain the first information using an anchor box located in a first grid among a plurality of grids, and obtain the second information by:

using a bounding box, as an anchor box, of the object included in the first frame located in the first grid, using a bounding box, as an anchor box, located in a second grid among the plurality of grids around the first grid based on information about a motion of the object included in the second frame, or using a bounding box, as an anchor box, located in the first grid and a plurality of third grids from among the plurality of grids located at an upper, lower, left, or right portions of the first grid.

2. The electronic device of claim 1, wherein the first information comprises information about a bounding box comprising information about a size of the object included in the first frame.

3. The electronic device of claim 2, wherein the second object detection network is trained to obtain information about an object by using a bounding box of an object included in a previous frame as an anchor box.

4. The electronic device of claim 1, wherein each of the plurality of frames is classified into a plurality of frame sections, wherein each of the plurality of frame sections comprises an intra frame and at least two inter frames, and wherein the first frame is the intra frame, and the second frame is an inter frame of the at least two inter frames.

5. The electronic device of claim 4, wherein the plurality of frame sections are classified based on a video frame included in video codec information.

6. A method of controlling an electronic device, the method comprising:

inputting information about a first frame among a plurality of frames to a first object detection network and obtaining first information about an object included in the first frame;

storing the first information in the at least one memory; and inputting the first information and information about a second frame among the plurality of frames to a second object detection network and obtaining second information about an object included in the second frame, wherein the second frame is a next frame following the first frame, wherein the first object detection network and the second object detection network are separate object detection networks, wherein the first object detection network is trained to obtain information about an object by using a plurality of anchor boxes, wherein the obtaining the first information comprises obtaining the first information using an anchor box located in a first grid among a plurality of grids, and wherein the obtaining the second information comprises obtaining the second information using:

a bounding box, as an anchor box, of the object included in the first frame located in the first grid, a bounding box, as an anchor box, located in a second grid among the plurality of grids around the first grid based on information about a motion of the object included in the second frame, or a bounding box, as an anchor box, located in the first grid and a plurality of third grids from among the plurality of grids located at an upper, lower, left, or right portions of the first grid.

7. The method of claim 6, wherein the first information comprises information about a bounding box comprising information about a size of the object included in the first frame.

8. The method of claim 7, wherein the second object detection network is trained to obtain information about an object by using a bounding box of an object included in a previous frame as an anchor box.

9. The method of claim 6, wherein each of the plurality of frames is classified into a plurality of frame sections, wherein each of the plurality of frame sections comprises an intra frame and at least two inter frames, and wherein the first frame is the intra frame, and the second frame is an inter frame of the at least two inter frames.

* * * * *